(12) United States Patent
Chang

(10) Patent No.: US 10,248,519 B2
(45) Date of Patent: Apr. 2, 2019

(54) INPUT DEVICE TEST SYSTEM AND METHOD THEREOF

(71) Applicant: PRIMAX ELECTRONICS LTD., Taipei (TW)

(72) Inventor: Pei-Ming Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 143 days.

(21) Appl. No.: 15/433,186

(22) Filed: Feb. 15, 2017

(65) Prior Publication Data
US 2018/0150370 A1 May 31, 2018

(30) Foreign Application Priority Data
Nov. 25, 2016 (TW) ............................. 105138914 A

(51) Int. Cl.
| | |
|---|---|
| *G06F 11/00* | (2006.01) |
| *G06F 11/22* | (2006.01) |
| *H04W 4/80* | (2018.01) |
| *G06F 11/263* | (2006.01) |
| *G06F 11/277* | (2006.01) |
| *G06F 11/30* | (2006.01) |

(52) U.S. Cl.
CPC ...... *G06F 11/2289* (2013.01); *G06F 11/2221* (2013.01); *G06F 11/263* (2013.01); *G06F 11/277* (2013.01); *G06F 11/3027* (2013.01); *G06F 11/3051* (2013.01); *H04W 4/80* (2018.02)

(58) Field of Classification Search
CPC .................................................. G06F 11/2289
USPC .............................. 714/44, 45, 46, 47.1, 47.2
See application file for complete search history.

(56) References Cited

U.S. PATENT DOCUMENTS

| | | | | |
|---|---|---|---|---|
| 3,057,958 A | * | 10/1962 | Peterson | H04L 1/248 178/69 R |
| 4,409,656 A | * | 10/1983 | Andersen | G06F 13/366 709/250 |
| 2015/0180979 A1 | * | 6/2015 | Jambunathan | H04L 67/141 713/150 |
| 2016/0234664 A1 | * | 8/2016 | Vendrow | H04M 1/57 |

* cited by examiner

*Primary Examiner* — Dieu Minh T Le
(74) *Attorney, Agent, or Firm* — Kirton McConkie; Evan R. Witt

(57) ABSTRACT

The present invention provides an input device test system, configured to test an input device having a plurality of functional elements. The input device test system includes: a test host, configured to execute a test program and a message interception program, and output a test message by means of the test program; and a test platform, configured to receive the test message and operate the input device according to the test message, where the input device outputs a response message to the test host in response to the operation, where the message interception program is used to intercept the response message and convert the response message into at least one code, and the test program determines whether the at least one code is consistent with the test message.

5 Claims, 4 Drawing Sheets

INPUT DEVICE TEST SYSTEM AND METHOD THEREOF

FIELD OF THE INVENTION

The present invention relates to the application field of an input device, and in particular, to a system and a method for testing multifunctional input device.

BACKGROUND OF THE INVENTION

In the modern society, computers have become an indispensable part of human life. Computers and relevant applications of products relevant to the computers can be seen everywhere in life in aspects of food, clothing, housing, transportation, education, and entertainment.

With the popularity and diversity of computers, lots of brand-new computer peripheral devices have also constantly emerged. However, to save space and enable a user to conveniently use computer peripheral devices, the computer peripheral devices also develop towards a direction of being small and exquisite with versatility at the same time. For example, a printer may have a function of a faxing machine or a scanner; by attaching a touch function to a liquid crystal screen, a 2D or 3D film may be watched on the liquid crystal screen; an input device, for example, a keyboard, or a mouse, further has a resistive or capacitive touch detector in addition to original functions of keys and a scroll wheel middle key, so that a user can conveniently input an instruction into a computer.

However, in all the computer peripheral devices, because the input device is used as a medium for communication between a person and a computer, in a process of manufacturing the input device, it is extremely important to test whether the input device can correctly operate.

An existing input device always has a plurality of compound functional elements, for example, a mouse having touch and key functions or a touchpad of a notebook computer. However, because test systems on production lines are mostly windows working system, mutual influence between a mouse or a touchpad to be tested and a cursor input device of the test system itself may exists, and consequently, a cursor of the test system itself is out of control or jumps irregularly, even a misjudgment by the test system is caused.

In view of the above, how to provide a test system that can distinguish an input device to be tested from an input device of the test system itself, so as to avoid mutual influence therebetween is a technical problem to be resolved by the present invention.

SUMMARY OF THE INVENTION

A main objective of the present invention lies in providing a test system that can test an input device having a plurality of functional elements. By means of the test system, a response message output by an input device to be tested is re-encoded to distinguish the input device to be tested from an input device of a test host itself, so that mutual influence between the input device to be tested and the input device of the test host itself does not exist, and at the same time, a function of testing the functional elements of the input device is achieved.

To achieve the foregoing objective, the present invention provides an input device test system, configured to test an input device having a plurality of functional elements, where the input device test system includes:

a test host, configured to execute a test program and a message interception program, and output a test message by means of the test program; and a test platform, configured to receive the test message and operate the input device according to the test message, where the input device outputs a response message to the test host in response to the operation, where the message interception program is used to intercept the response message and convert the response message into at least one code, and the test program determines whether the at least one code is consistent with the test message.

In the foregoing preferred implementation manner, the input device is a mouse or a touchpad.

In the foregoing preferred implementation manner, the functional elements include: a left key, a right key, a capacitance detector, or an optical detector.

In the foregoing preferred implementation manner, the test host includes a screen, which is configured to display a human-machine interface of the test program.

In the foregoing preferred implementation manner, the response message includes a plurality of message packets output by the functional elements.

In the foregoing preferred implementation manner, the message interception program converts the message packets into the at least one code.

In the foregoing preferred implementation manner, the input device outputs the response message to the test host by means of Bluetooth wireless communication or a universal serial bus interface.

Another preferred practice of the present invention relates to an input device test method, used to test an input device having a plurality of functional elements, where the input device test method includes the following steps:

(a). generating a test message;

(b). operating the input device according to the test message, and enabling the input device to output a response message in response to the operation;

(c). converting the response message into at least one code;

(d). determining whether the at least one code is consistent with the test message; and (e). displaying a test result according to whether the at least one code is consistent with the test message.

DETAILED DESCRIPTION OF THE PREFERRED EMBODIMENT

Figure 1A:
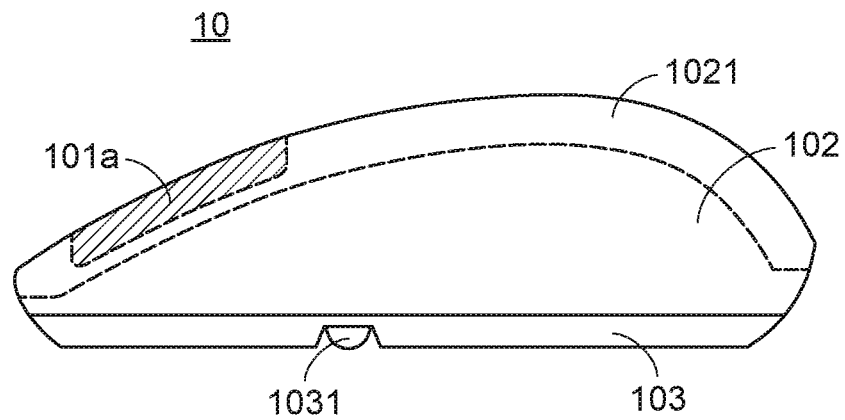
FIG. 1A is a side view of a multifunctional input device.
Figure 1B:
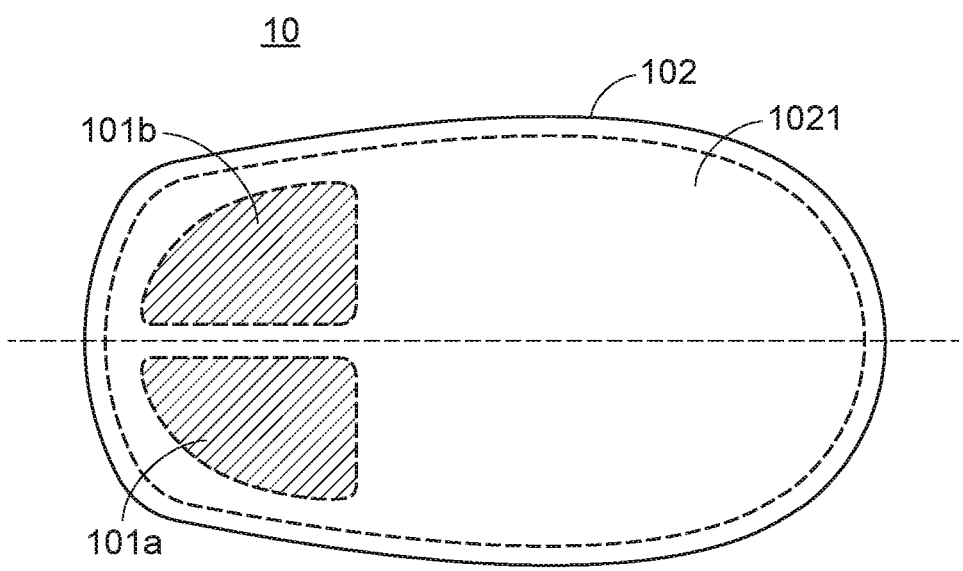
FIG. 1B is a top view of the multifunctional input device.

Advantages and features of the present invention and a method for implementing same will be described in a more detailed way with reference to exemplary embodiments and the accompanying drawings for easier understanding. However, the present invention may be implemented in different forms and should not be understood to be limited only to the embodiments stated herein. On the contrary, for a person of ordinary skill in the art, the provided embodiments will make the present disclosure more thorough and more comprehensive and completely convey the scope of the present invention, First, referring to FIG. 1A and FIG. 1B, FIG. 1A is a side view of a multifunctional input device; and FIG. 1B is a top view of the multifunctional input device. The multifunctional input device of the present invention may be a computer peripheral apparatus that has a left key, a right key, a capacitance detector, or an optical detector, for example, a mouse, a touchpad, or the like.

In FIG. 1A and FIG. 1B, the multifunctional input device is a cursor input device, that is, a mouse 10; the mouse 10 includes an upper cover housing 102, a lower cover housing 103, and a plurality of functional elements disposed therein. The functional elements include: a left key 101a, a right key 101b, a capacitance detector 1021, and an optical detector 1031. The left key 101a and the right key 101b may be left and right keys having themselves entities, or left and right keys formed by means of a location of contact between a finger and the upper cover housing 102 on the mouse 10, or left and right keys formed by left-right swing of the upper cover housing 102 of the mouse 10. The capacitance detector 1021 is a capacitive printed circuit hoard disposed on an inner layer of the upper cover housing 102 of the mouse 10. The capacitance detector 1021 changes a tiny capacitance in a circuit by using a human body capacitance effect, so as to detect a dynamic condition of a finger or palm on the upper cover housing 1021 of the mouse 10. For example, the capacitance detector 102 can detect mobile state of the finger on the upper cover housing 1021; when the finger slides from up to down or from left to right at a location of the left key 101a or the right key 101b, an operation of sliding a webpage from up to down or switching a page on a computer screen is performed; the optical detector 1031 is provided on the lower cover housing 103; the optical detector 1031 can collect movement directions and relative moment, on a surface of an object where the mouse 10 is placed, of the mouse 10, and a user operates clicking and movement of a cursor on the screen by moving the mouse 10.

Figure 2:
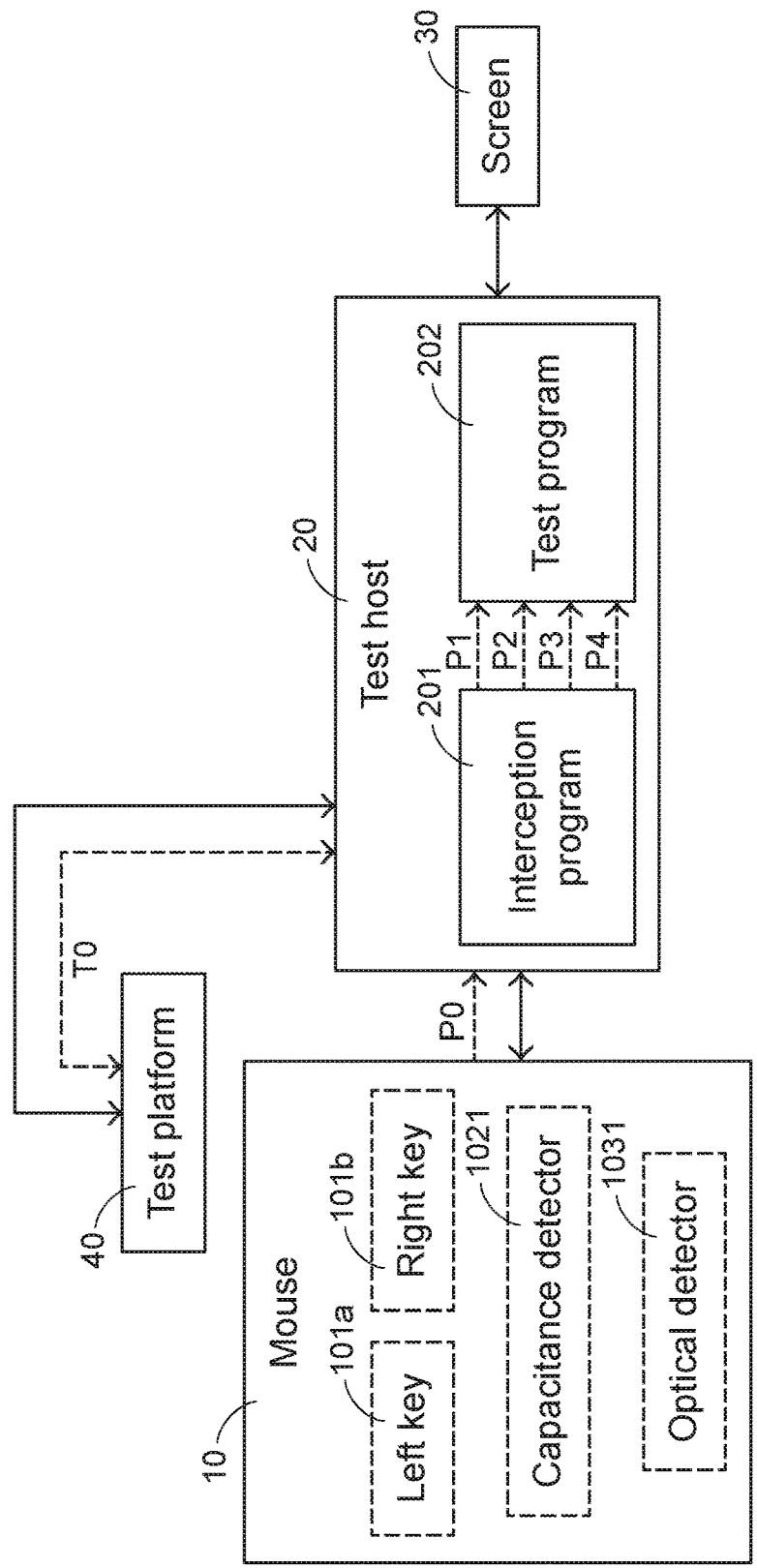
FIG. 2 is an input device test system according to the present invention.

Next, referring to FIG. 1A, FIG. 1B, and FIG. 2 together. FIG. 2 is an input device test system of the present invention. The input device test system includes: a mouse 10, a test host 20, a screen 30, and a test platform 40. The test host 20 is a computer host of a windows working system, and also has an input device for operation (not shown in the drawings) of itself. The test host 20 is electrically connected to the test platform 40 by means of a parallel port. In addition, the test host 20 is configured to install and execute a message interception program 201 and a test program 202. A user can operate the test program 202 by using the input device (not shown in the drawings) of the test host 20 itself. The test program 202 is written by using common Labview software. The test program 202 outputs a test message T0 to the test platform 40 by means of the parallel port. The test platform 40 operates according to an instruction of the test message T0. For example, the test platform 40 may be a mechanical arm or an electromagnetic controlled striking head. When the input device is tested, the test platform 40 operates movement of the mouse 10 by using the mechanical arm according to the instruction of the test message T0 so that the optical detector 1031 generates a response message P0, or knocks the left key 101a or the right key 101b of the mouse 10 by using the striking head to make the left key 101a or the right key 101b generate the response message P0; the mouse 10 transmits the response message P0 to the test host 20 by means of Bluetooth wireless communication or a universal serial bus (USB) interface. The message interception program 201 in the test host 20 is written by C language; the message interception program 201 is a hook program, which is used to intercept a message more underlying than a message of establishing the hook program in the windows working system. In the present invention, the message interception program 201 is used to intercept the response message P0 transmitted by the mouse 10 to the test host 20. The screen 30 is used to display a human-machine interface of the test program 202, and facilitate a user to operate the input device test system by means of the input device (not shown in the drawings) of the test host 20 itself.

Figure 3:
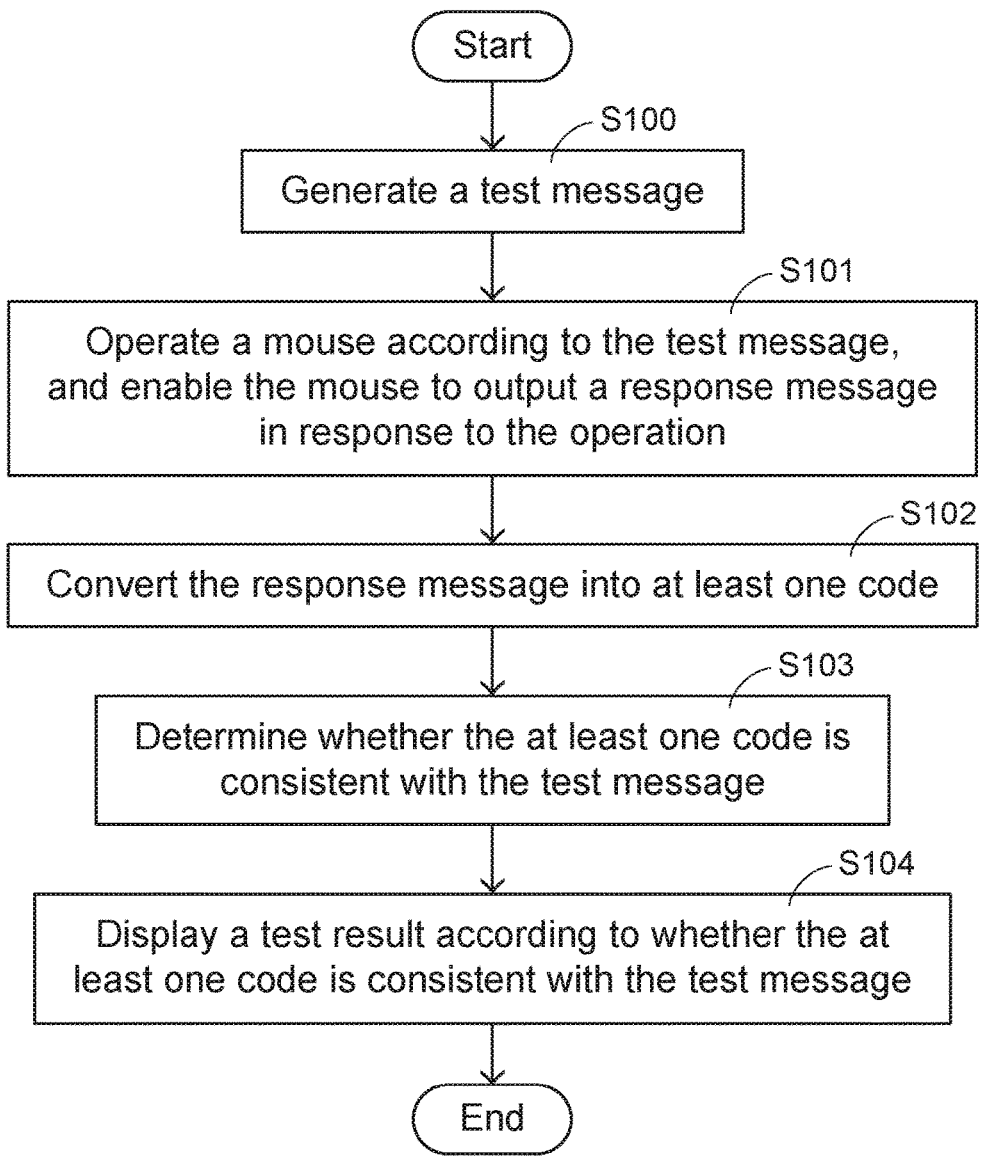
FIG. 3 is a test flowchart of the input device test system of the present invention.

Referring to FIG. 2 and FIG. 3 together, FIG. 3 is a test flowchart of the input device test system of the present invention. When the input device is tested, first, the test message T0 is generated (step S100); in step S100, the test program 202 may be driven, manually or automatically, to generate and output the test message T0 from the test host 20 to the test platform 40; after receiving the test message T0, the test platform 40 operates the mouse 10 according to the test message T0, and enables the mouse 10 to output the response message P0 in response to the operation (step S101); in step S101, if test information included in the test message T0 is to test the left key 101a of the mouse 10 for six times, then the test platform 40 knocks the left key 101a of the mouse 10 for six times in sequence by using the striking head within preset time; if the test information included in the test message T0 is to test the optical detector 1031 of the mouse 10, then the test platform 40 operates the mouse 10 by using the mechanical arm to move towards a preset direction at a preset speed.

Subsequently, the mouse 10 outputs the response message P0 to the test host 20. Because the mouse 10 includes the plurality of functional elements (the left key 101a, the right key 101b, the capacitance detector 1021, and the optical detector 1031), when the mouse 10 performs an operation test, according to the test information included in the test message T0, the response message P0 output by the mouse 10 includes: a message packet output by the left key 101a, a message packet output by the right key 101b, a message packet output by the capacitance detector 1021, or a message packet output by the optical detector 1031. After receiving the response message P0, the test host 20 intercepts the response message P0 and converts the response message P0 into at least one code by using the message interception program 201 (step S102). In step S102, after intercepting the response message P0, the message interception program 201 re-encodes the response message packet output by the left key 101a, the response message packet output by the right key 101b, the response message packet output by the capacitance detector 1021, or the response message packet output by the optical detector 1031. After re-encoding is completed, a response message code P1 of the left key 101a, a response message code P2 of the right key 101b, a response message code P3 of the capacitance detector 1021, or a response message code P4 of the optical detector 1031 is further transmitted to the test program 202. Because the response message P0 has been intercepted by the message interception program 201, the mouse 10 can be effectively distinguished from the input device (riot shown in the drawings) of the test host 20 itself, so that mutual influence between the mouse 10 and the input device (not shown in the drawings) of the test host 20 itself does not exist.

Next, the test program 202 determines whether the at least one code is consistent with the test message T0 (step S103); in step S103, the test program 202 compares the test message T0 generated in step S100 with the response message code P1 of the left key 101a, the response message code P2 of the right key 101b, the response message code P3 of the capacitance detector 1021, or the response message code P4 of the optical detector 1031. For example, when the test information included in the test message T0 is to test the left key 101a of the mouse 10, then the test program 202 determines whether the response message code P1 of the left key 101a is received.

Finally, the screen 30 displays a test result according to whether the at least one code is consistent with the test message T0 (step S104); in step S104, if the test message T0 is consistent with the response message code (P1, P2, P3, or P4), then test pass is displayed in the human-machine interface of the screen 30; if the test message T0 is not consistent with the response message code (P1, P2, P3, or P4), then test failure is displayed in the human-machine interface of the screen 30. For example, the test information included in the test message T0 is to test the left key 101a of the mouse 10, then the test program 202 determines whether the response message code P1 of the left key 101a has been received; if the response message code P1 of the left key 101a has been received, pass is displayed on the screen 30; on the contrary, if the test information included in the test message T0 is to test the left key 101a of the mouse 10, but the test program 202 does not receive the response message code P1 of the left key 101a or receives the response message code P2 of the right key 101b, then failure is displayed on the screen 30.

The input device test system according to the present invention not only can effectively distinguish an input device to be tested from an input device (not shown in the drawings) of the test host 20 itself, so that mutual influence therebetween does not exist; on the other aspect, a plurality of functional elements of the input device can be tested respectively; for example, when a user wants to test a left key 101a and a right key 101b of a mouse 10, the test program 202 can be set to identify only a response message code P1 of the left right 101a and a response message code P2 of the right key 101b, and overlook a response message code P3 of a capacitance detector 1021 and a response message code P4 of an optical detector 1031; or when the user wants to test the capacitance detector 1021 of the mouse 10, the test program 202 can be set to identify only the response message code P3 of the capacitance detector 1021, and overlook the response message code P1 of the left key 101a, the response message code P2 of the right key 101b, and the response message code P4 of the optical detector 1031; even or when the user wants to test the optical detector 1031 of the mouse 10, the test program 202 can be set to identify only the response message code P4 of the optical detector 1031, and overlook the response message code P1 of the left key 101a, the response message code P2 of the right key 101b, and the response message code P3 of the capacitance detector 1021.

Figure 4:
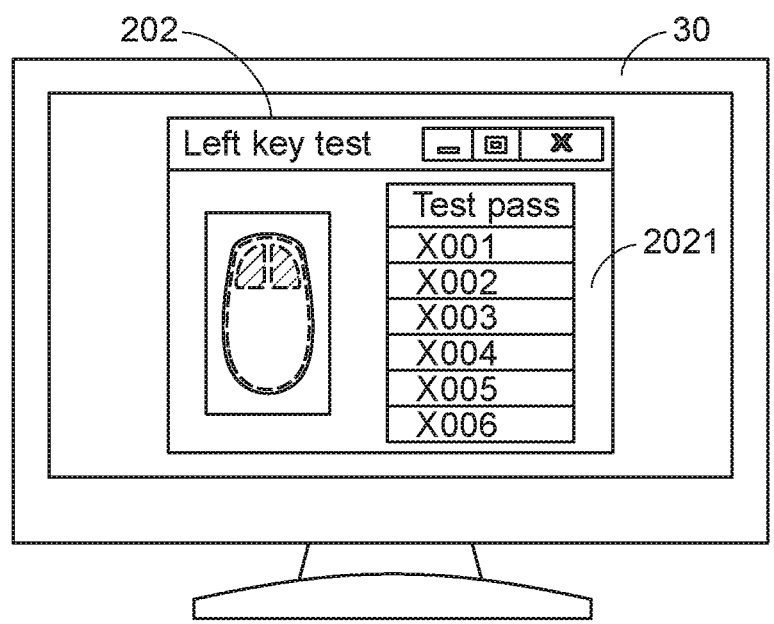
FIG. 4 is a schematic scenario diagram of display of a human-machine interface of the input device test system of the present invention.

Referring to FIG. 4, FIG. 4 is a schematic scenario diagram of display of a human-machine interface of the input device test system of the present invention. In FIG. 4, suppose that the test information included in the test message T0 is to test the left key 101a of the mouse 10 for six times, then the message interception program 201 re-encodes the response message packet output by the left key 101a as X00Y (a value of Y ranges between 1 and 9), and codes, for example, X001, X002, X003, X004, X005, and X006 are displayed in a human-machine interface 2021 of the test program 202 on the screen 30, and at the same time, test pass of the left key 101a of the mouse 10 is displayed.

Compared with the prior art, the input device test system according to the present invention can test respectively whether functional element of an input device can normally operate, and at the same time, can distinguish the input device to be tested from an input device of the test host 20 itself, so that mutual influence therebetween does not exist, thereby effectively improving accuracy of product test and efficiency of automatic production. Therefore, the present invention is of great industrial value.

Various modifications are made to the present invention by a person skilled in the art, but the protection scope of the present invention is subject to the appended claims.

What is claimed is:

1. A mouse device test system, configured to test a mouse device having a plurality of functional elements and the functional elements comprise a left key, a right key, a capacitance detector, or an optical detector, wherein the mouse device test system comprises:
    a test host, configured to execute a test program and a message interception program, and output a test message by means of the test program, wherein the test message comprising testing the left key, the right key, or the optical detector; and
    a test platform, configured to receive the test message and operate the mouse device according to the test message, wherein the mouse device outputs a response message to the test host in response to the operation, wherein the test platform is a mechanical arm or a striking head, and when the test message comprises testing the left key or the right key, the striking head strikes the left key or the right key and when the test message comprises testing the optical detector, the mechanical arm moves the mouse device towards a preset direction at a preset speed, wherein
    the message interception program is used to intercept the response message and convert the response message into at least one code, and the test program determines whether the at least one code is consistent with the test message.

2. The mouse device test system according to claim 1, wherein the test host comprises a screen, which is configured to display a human-machine interface of the test program.

3. The mouse device test system according to claim 1, wherein the response message comprises a plurality of message packets output by the functional elements.

4. The mouse device test system according to claim 3, wherein the message interception program converts the message packets into the at least one code.

5. The mouse device test system according to claim 1, wherein the mouse device outputs the response message to the test host by means of Bluetooth wireless communication or a universal serial bus interface.

* * * * *